(12) United States Patent
Janiaud et al.

(10) Patent No.: US 8,869,615 B2
(45) Date of Patent: Oct. 28, 2014

(54) ELEMENT VIBRATING IN TWO UNCOUPLED MODES, AND USE IN VIBRATING RATE GYROSCOPE

(75) Inventors: Denis Janiaud, Les Ulis (FR); Olivier Le Traon, Vauhallan (FR); Claude Chartier, Massy (FR); Stève Masson, Le Plessis-Robinson (FR); Jean Guerard, Juvisy (FR); Raphaël Levy, Paris (FR); Marc Pernice, Fresnes (FR)

(73) Assignee: ONERA (Office National d'Etudes et de Recherche Aerospatiales), Chatillon (FR)

( * ) Notice: Subject to any disclaimer, the term of this patent is extended or adjusted under 35 U.S.C. 154(b) by 297 days.

(21) Appl. No.: 13/262,317

(22) PCT Filed: Apr. 1, 2010

(86) PCT No.: PCT/EP2010/054443
§ 371 (c)(1),
(2), (4) Date: Oct. 24, 2011

(87) PCT Pub. No.: WO2010/112594
PCT Pub. Date: Oct. 7, 2010

(65) Prior Publication Data
US 2012/0024060 A1 Feb. 2, 2012

(30) Foreign Application Priority Data

Apr. 3, 2009 (FR) ...................................... 09 52172

(51) Int. Cl.
*G01C 19/56* (2012.01)
*G01C 19/5607* (2012.01)

(52) U.S. Cl.
CPC .................................. *G01C 19/5607* (2013.01)
USPC .................. 73/504.15; 73/504.16; 73/504.12

(58) Field of Classification Search
USPC ............... 73/504.12, 504.15, 504.16, 504.02, 73/504.04
See application file for complete search history.

(56) References Cited

U.S. PATENT DOCUMENTS 4,538,461 A * 9/1985 Juptner et al. ............. 73/504.16
5,578,754 A * 11/1996 Kato et al. .................. 73/504.12
(Continued)

FOREIGN PATENT DOCUMENTS

DE 10 2007 018834 A1 10/2008
EP 0 809 087 A2 11/1997
(Continued)

OTHER PUBLICATIONS

International Search Report completed Jul. 6, 2010 and mailed Jul. 14, 2010 from corresponding International Application No. PCT/EP2010/054443 filed Apr. 1, 2010 (7 pages).
(Continued)

*Primary Examiner* — Helen Kwok
(74) *Attorney, Agent, or Firm* — Klein, O'Neill & Singh, LLP

(57) ABSTRACT

The present disclosure relates to a vibrating element which is planar parallelly to an electrical crystallographic axis of a piezoelectric material such as quartz. The element comprises a beam holding electrodes, a stationary portion rigidly connected to one end of the beam, and a solid portion rigidly connected to the other end of the beam. The structure with facets from the chemical machining of the element has an axis of symmetry parallel to the electrical axis, and the solid portion has a center of gravity on the axis of symmetry. The useful vibration modes of the vibrating element, according to which the solid portion is reciprocatingly rotated about the axis of symmetry and reciprocatingly moved parallel to the plane of the element, are uncoupled. The measurement of an angular speed by a rate gyroscope including said vibrating elements is more precise.

20 Claims, 9 Drawing Sheets

(56) References Cited

U.S. PATENT DOCUMENTS

| | | | |
|---|---|---|---|
| 5,796,000 A * | 8/1998 | Fujiu et al. | 73/504.15 |
| 5,913,244 A * | 6/1999 | Heinouchi | 73/662 |
| 5,998,911 A * | 12/1999 | Kikuchi et al. | 310/367 |
| 7,975,545 B2 * | 7/2011 | Noguchi et al. | 73/504.12 |
| 8,418,553 B2 * | 4/2013 | Tamura et al. | 73/504.12 |
| 8,479,574 B2 * | 7/2013 | Krylov et al. | 73/504.12 |
| 2003/0084723 A1 * | 5/2003 | Kikuchi et al. | 73/504.12 |
| 2006/0201248 A1 * | 9/2006 | Unno | 73/504.12 |
| 2011/0226057 A1 * | 9/2011 | Nishizawa | 73/504.12 |
| 2012/0132002 A1 * | 5/2012 | Dube et al. | 73/504.16 |

FOREIGN PATENT DOCUMENTS

| | | | |
|---|---|---|---|
| EP | 0 844 461 A2 | 5/1998 |
| EP | 1 096 260 A1 | 5/2001 |
| EP | 1 962 055 A2 | 8/2008 |

OTHER PUBLICATIONS

Written Opinion completed Jul. 6, 2010 and mailed Jul. 14, 2010 from corresponding International Application No. PCT/EP2010/054443 filed Apr. 1, 2010 (7 pages).

International Preliminary Report on Patentability completed Oct. 28, 2010 and mailed Feb. 24, 2011 from corresponding International Application No. PCT/EP2010/054443 filed Apr. 1, 2010 (8 pages).

* cited by examiner

ELEMENT VIBRATING IN TWO UNCOUPLED MODES, AND USE IN VIBRATING RATE GYROSCOPE

CROSS-REFERENCE TO RELATED APPLICATIONS

This is a national phase application under 35 U.S.C. §371 of PCT Application No. PCT/EP2010/054443, filed Apr. 1, 2010, which claims the benefit of French application No. 09/52172 filed Apr. 3, 2009, the contents of which are expressly incorporated herein by reference.

FIELD OF ART

The present disclosure relates generally to vibratory gyrometers used for measuring the rotation of a vehicle in the space.

More particularly, the present disclosure concerns a vibrating element configuration made in a piezoelectric material for such a gyrometer.

BACKGROUND

The operating principle of a vibratory gyrometer is based on the sensing of Coriolis accelerations acting on an element vibrating according to a first useful mode of vibration, referred to as drive mode, when this element is subjected to a rotation with angular velocity $\Omega$ referenced with respect to an inertial frame of reference, referred to as Galilean frame of reference. The Coriolis accelerations are alternating at the frequency of the first useful mode and excite a second transversal useful mode of vibration, referred to as a sense mode and the vibration amplitude of which is proportional to $\Omega$. The vibration amplitude is generally converted into the shape of electric signals and measured to determine $\Omega$.

It is known (EP-A2-1 962 055; EP-A2-0 844 461) that the vibrating element can be a tuning fork formed of two identical and parallel branches facing each other and each fixed each at one end to a common part, as shown in FIG. 1. The drive mode is a flexional resonance vibration of the two branches in phase opposition therebetween parallel to the plane XY of the tuning fork. When the tuning fork is subjected to rotation about an axis parallel to the longitudinal axis of the tuning fork, the sense mode is a flexional resonance vibration of the two branches in phase opposition therebetween perpendicularly to the plane XY of the tuning fork.

The tuning fork is made through chemical machining of a quartz plate of a uniform thickness in an etching bath comprising hydrofluoric acid, as it is implemented for clock resonators. The tuning fork first takes advantage of the excellent dimensional definition of the photolithographic methods, secondly, of the easy piezoelectric excitation and sensing of both useful modes by means of electrodes deposited on the quartz, and third, of a very reduced industrial manufacture cost.

The quartz plate with a uniform thickness is parallel to the electric and mechanical crystallographic plane XY of the quartz to facilitate the chemical machining. The branches of the tuning fork are oriented following a mechanical crystallographic axis Y to allow for a good efficiency of the piezoelectric excitation and sensing.

As a result of the advantages thereof the chemical machining of the quartz inevitably results in oblique facets occurring with respect to the main crystallographic axes X and Y of the tuning fork, as shown in a simplified way on FIG. 1. First oblique facets fo are located at the foot of the branches of the tuning fork, at the start of the common part, and second oblique facets shaped as dihedron fd are located on each of the branches along a machined flank, the other machined flank being nearly planar and perpendicular to the plane of the plate. These facets, having quite large dimensions, are very well defined and reproducible from one machining to another, and do not have any drawback when the tuning fork operates according to a single vibratory mode, as it is the case with clock resonators, as they can be easily taken into account for the geometric definition of photolithographic tools.

In contrast, when the tuning fork is used as a vibrating element of a gyrometer operating according to two useful vibration modes, the oblique facets have the drawback of creating a mechanical coupling between these useful vibration modes within each beam forming a branch of the tuning fork. Such a mechanical coupling results on the sense electrodes in the occurrence of an electric signal that is in quadrature with the Coriolis signal and that should be removed so as to be able to determine the angular velocity $\Omega$.

Two means are known for removing such a quadrature signal.

The first known means implements electronic circuits for signal processing aiming at removing the quadrature signal through synchronous demodulation. The first means is however unsatisfactory when low rotational velocities are to be measured, as the Coriolis signal is then very small with respect to the quadrature signal and it becomes difficult to control with a sufficient accuracy the phase of the electric signals for taking advantage of the synchronous demodulation.

The second known means for removing the quadrature signal consists in directly acting on the vibrating element, for instance carrying a trimming using a mechanical tool until obtaining a sufficient reduction of the electric quadrature signal present on the sense electrodes, as disclosed in U.S. Pat. No. 6,101,878. The second means significantly increases the measurement accuracy for the gyrometer, but has the drawback of increasing the manufacturing cost, as each gyrometer copy being manufactured should be submitted to a specific trimming operation.

In order to reduce the mechanical coupling without carrying out a trimming, it seems interesting to orient the branches of the tuning fork according to another axis than the axis Y in the plane XY of the plate, for example following an electric crystallographic axis X, as shown on FIG. 2. Indeed, the chemical machining of a thus oriented tuning fork produces significantly reduced oblique facets at the foot of the branches and does not produce any oblique facet along the machined flanks of the branches. The mechanical coupling achieved within each beam of such a tuning fork is more significant than the previous embodiment with the branches oriented following the axis Y. This is due to the mechanical anisotropy of the quartz which, for branches oriented following the axis X, prevents that the vibrations of the two useful modes are independent from each other.

SUMMARY

The object of the present method, system and device is to overcome these drawbacks linked to the chemical machining of a tuning fork in quartz by providing other configurations of the piezoelectric vibrating element of a gyrometer so that the oblique facets issued from the chemical machining do not create nearly any mechanical coupling between the two useful modes of vibration within a beam of the vibrating element, which is favorable to the measurement accuracy of the gyrometer.

Accordingly, a vibrating element made in a piezoelectric material machinable through a chemical way, having first and second modes of vibration and having a monolithic structure with a uniform thickness and being planar parallelly to an electric crystallographic axis of the material, and including a substantially parallelepipedic beam supporting electrodes able to take part in one of the two modes of vibration, a fixed part fastened to one of the ends of the beam, and a mass part fastened to the other end of the beam, the mass part being able to move with an alternating displacement parallel to the plane of the monolithic structure following the second mode of vibration, is characterized in that the structure has a symmetry axis parallel to the electric crystallographic axis, and the mass part has a center of gravity located on the symmetry axis and is able to move with an alternating rotation about the symmetry axis following the first mode of vibration.

The symmetry of the structure of the vibrating element, including the facets due to the chemical machining of the vibrating element, with respect to an axis parallel to an electric crystallographic axis of the piezoelectric material belonging, like quartz, to the crystal symmetry class 32 with a trigonal crystal system provides the mechanical decoupling between the first and the second useful modes of vibration in the vibrating element. The position of the gravity center of the mass part on the symmetry axis can lead to the two useful modes having substantially equal resonant frequencies, which enhances the measurement accuracy of a component of the angular velocity of the rotation to which the vibrating element is able to be subjected.

The electrodes of the vibrating element are all supported by the beam, whatever the mode of vibration according to which the mass part moves. The electrodes are able to take part in one of the useful modes of vibration of the vibrating element for a particular gyrometer configuration of the present method, system and device, although, in another configuration, the beam of the vibrating element supports both electrodes for exciting the first vibration mode of the vibrating element, according to which the mass part is able to move with an alternating rotation about the symmetry axis, and electrodes for sensing the second vibration mode of the vibrating element according to which the mass part is able to move with an alternating displacement parallel to the plane of the monolithic structure.

As will be described in the remainder of the description, two embodiments of a vibrating element according to the present method, system and device are set forth. According to a first embodiment, the mass part includes two branches symmetric about the symmetry axis and having ends fastened to said other end of the beam, and the gravity center of the mass part is located on the symmetry axis between the ends of the beam. According to a second embodiment, the vibrating element includes another beam supporting other electrodes, the two beams being substantially parallelepipedic, symmetric about the symmetry axis and having ends fastened therebetween and to the fixed part and other ends fastened to the mass part; the beams can form an angle of approximately 60°.

The present method, system and device also relate to a gyrometer including four vibrating elements according to the present method, system and device, thus protecting the vibration quality of the two useful modes against the influences of the fastening of the gyrometer. The gyrometer includes two first substantially identical vibrating elements according to the first or the second embodiment and supporting electrodes for taking part in the first mode of vibration, and two substantially identical second vibrating elements according to the first or the second embodiment and supporting electrodes for taking part in the second mode of vibration. In the gyrometer, the fixed parts of the vibrating elements include together a central common part connecting ends of the beams of the first vibrating elements and ends of the beams of the second vibrating elements, and flexible arms connecting the common part to a fastening part.

Although according to an alternative, the gyrometer is able to only include two substantially identical vibrating elements according to the first or the second embodiment and supporting both electrodes for taking part respectively in the first mode of vibration and the second mode of vibration, the separation of vibrating elements in two pairs, the electrodes of which are respectively allocated to the excitation of the first mode of vibration and to the sensing of the second mode of vibration, provides a better decoupling between the two modes by means, more specifically, of the common part remaining substantially stationary for both modes of vibration, imparting more accuracy to the measurement of the angular velocity of the rotation.

When the vibrating elements are implemented according to the first embodiment and have each a beam collinear to that of another vibrating element, electrodes able to take part in the first mode of vibration and supported by each of the faces of the beam of each first vibrating element are first and second longitudinal electrodes respectively superposed to second and first electrodes on the other face of the beam and respectively collinear to first and second electrodes on the other first vibrating element, the four first electrodes being connected therebetween and the four second electrodes being connected therebetween, and electrodes able to take part in the second mode of vibration and supported by each of the faces of the beam of each second vibrating element are third and fourth longitudinal electrodes respectively superposed to the third and fourth electrodes on the other face of the beam and respectively collinear to the fourth and third electrodes on the other second vibrating element, the four third electrodes being connected therebetween and the four fourth electrodes being connected therebetween.

When the gyrometer includes two first substantially identical vibrating elements being implemented according to the second embodiment and have each two beams, the beams of the first vibrating elements being two to two substantially collinear and supporting electrodes for taking part in the first mode of vibration, and two second substantially identical vibrating elements being implemented according to the second embodiment and have each two beams, the beams of the second vibrating elements being two to two substantially collinear and supporting electrodes for taking part in the second mode of vibration, the electrodes are distributed in first and second electrodes able to take part in the first mode of vibration and third and fourth electrodes able to take part in the second mode of vibration.

The faces of a beam of each first vibrating element longitudinally support first parallel electrodes and second parallel electrodes. A first electrode on a face of the beam of each first vibrating element is superposed to a second electrode on the other face of the beam. The first electrodes on two substantially collinear beams of the first vibrating elements are substantially collinear two to two. The second electrodes on two substantially collinear beams of the first vibrating elements are substantially collinear two to two. The eight first electrodes are connected therebetween and the eight second electrodes are connected therebetween.

Each one of the faces of a beam of a second vibrating element supports three parallel electrodes extending longitudinally. Said three electrodes of a beam are two third electrodes adjacent to the flanks of the beam and a fourth electrode is arranged between the third electrodes. The four third electrodes on the faces of a beam are superposed two to two. The two fourth electrodes on the faces of a beam are superposed. The eight third electrodes on two first substantially collinear beams of the second vibrating elements are connected and respectively substantially collinear two to two. The four fourth electrodes on the two first beams of the second vibrating elements are connected and respectively substantially collinear two to two. Eight third electrodes and four fourth electrodes on two second substantially collinear beams of the second vibrating elements are arranged in the same manner as the eight third electrodes and the four fourth electrodes on the first beams of the second vibrating elements.

The eight third electrodes on the first beams of the second vibrating elements are connected to four fourth electrodes of the second beams of the second vibrating elements. The eight third electrodes on the second beams of the second vibrating elements are connected to the four fourth electrodes of the first beams of the second vibrating elements.

Practically, the allocation of the first mode to one of the pairs of substantially identical vibrating elements can result from differences between the dimensions and consequently, between the resonant frequencies of the first vibrating elements and the second vibrating elements. The excitation of the first mode by the electrodes of the first vibrating elements does not produce any vibration of the second vibrating elements.

The operation of the gyrometer according to the first mode of vibration, for instance as a drive mode excited by the electrodes of the first vibrating elements, generates Coriolis accelerations for the operation according to the second mode of vibration of the first vibrating elements, as a sense mode, when the gyrometer is biased by the rotation to be measured. When the second modes of vibration of the first and second vibrating elements have substantially equal resonant frequencies, the operation according to the second mode of vibration of the first vibrating elements is communicated to the second vibrating elements, the electrodes of which can sense the second mode of vibration.

BRIEF DESCRIPTION OF THE FIGURES

Other features and advantages of the present method, system and device will be become more clearly apparent on reading the following description of several embodiments of the present method, system and device given by way of non-limiting examples and with reference to the corresponding appended drawings, in which:

FIG. 1 is a perspective view of a prior art tuning fork already commented on;

FIG. 2 is a perspective view of another tuning fork derived from the prior art and already commented on;

DETAILED DESCRIPTION

Figure 1:
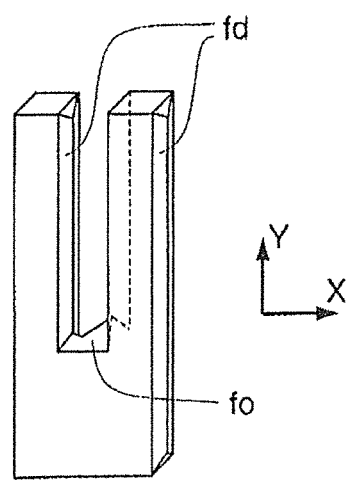
Figure 2:
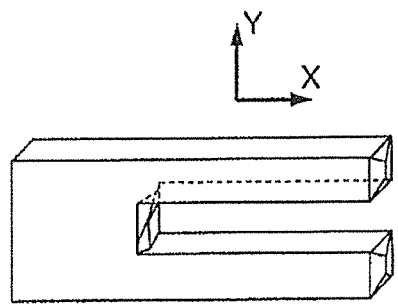
Figure 3A:
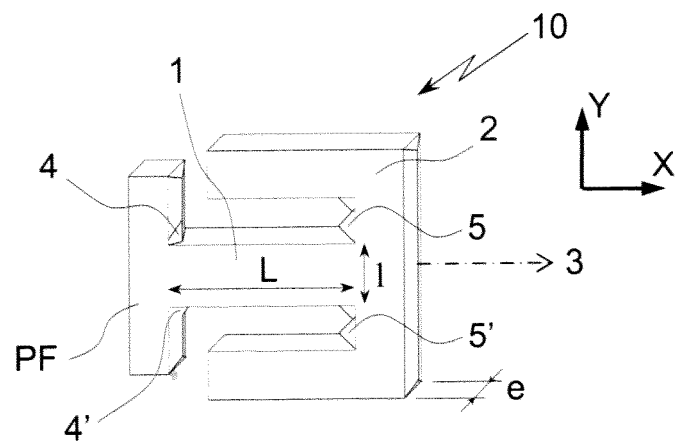
FIG. 3A is a perspective view of a vibrating element according to a first embodiment of the present method, system and device, achieved through chemical machining in a piezoelectric plate.

FIG. 3A shows a first embodiment of a monolithic vibrating element 10 according to the present method, system and device, machined in a planar plate made in a piezoelectric material such as quartz, having a uniform thickness e. The vibrating element 10 includes a substantially parallelepipedic beam 1, a fixed part PF fastened to one of the ends of the beam and a mass part 2 fastened to the other end of the beam. The vibrating element 10 is symmetric about the longitudinal axis 3 of the beam 1. The mass part 2 is dimensioned so that its center of gravity is located on the longitudinal symmetry axis 3 of the beam between the two ends of the beam. According to FIG. 3A, the mass part has a U shape, the web of which is fastened to the beam and perpendicular to the latter and the parallel branches of which are arranged on both faces of the beam 1. More generally, the mass part includes two branches symmetric about the symmetry axis 3 and having ends fastened to the end of the beam not fastened to the fixed part PF. According to other examples, the mass part has a C or a V shape, the ends of which are oriented to the fixed part.

The cross-sectional dimension l of the beam 1 taken in the plane of the plate is substantially larger than its other cross-sectional dimension e. Preferably the dimension l lies between about 1.3 times and about twice the dimension e. Preferably, the length dimension L of the beam 1 lies between about 4 times and about 5 times the dimension e.

Still with reference to FIG. 3A, the plate is perpendicular to the optical crystallographic axis Z of the quartz and thus parallel to the crystallographic plane XY of the quartz including the three "electric" crystallographic axes and the three "mechanical" crystallographic axes respectively perpendicular to the electric axes. In FIG. 3A, only one electric crystallographic axis designated to as X and one mechanical crystallographic axis referred to as Y are shown. The longitudinal axis 3 of the beam 1 is oriented following the electric crystallographic axis X. The chemical machining of the vibrating element 10 in an etching bath comprising hydrofluoric acid causes the occurrence of oblique facets 4 and 4' at the end of the beam 1 fastened to the fixed part PF, and oblique facets 5 and 5' at the other end fastened to the web of the U-shaped mass part 2. No dihedron-shaped facet appears on the machine flanks of the beam, as it is oriented according to the axis X. The facets 4 and 4' are respectively symmetric to each other with respect to the longitudinal axis 3 of the beam, and the facets 5 and 5' are respectively symmetric to each other with respect to the longitudinal axis 3 of the beam. The symmetry between the facets is due to the orientation of the beam according to the axis X of the quartz and to the nature of the etching bath comprising hydrofluoric acid. The vibrating element 10 made through chemical machining thus has a symmetry axis confused with the longitudinal axis 3 of the beam and parallel to the axis X. If the longitudinal axis 3 of the beam were oriented according to a mechanical crystallographic axis Y of the quartz, or more generally according to any other different direction of an electric crystallographic axis X in the crystallographic plane XY of the plate, the flanks of the beam would comprise dissymmetric facets.

Figure 3B:
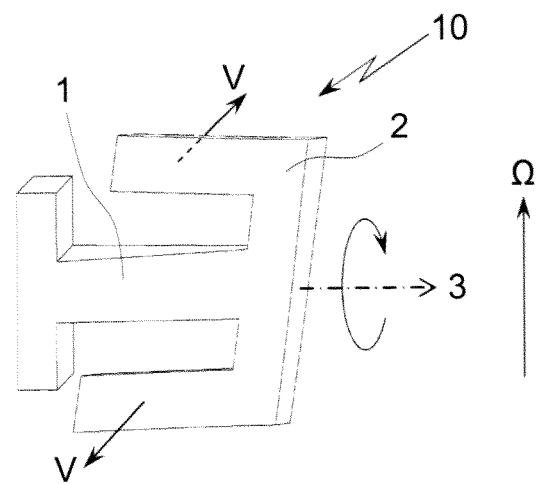
FIGS. 3B and 3C are perspective views showing exaggeratedly enlarged deformations of the vibrating element respectively for both useful modes of vibration.
Figure 3C:
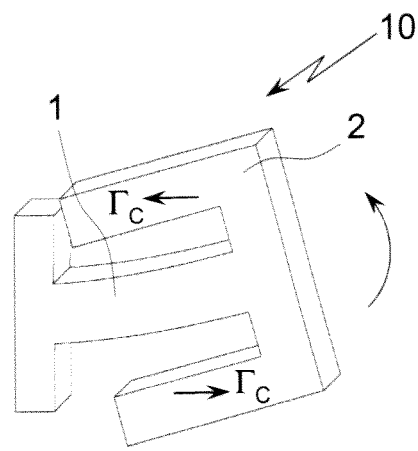
Figure 6:
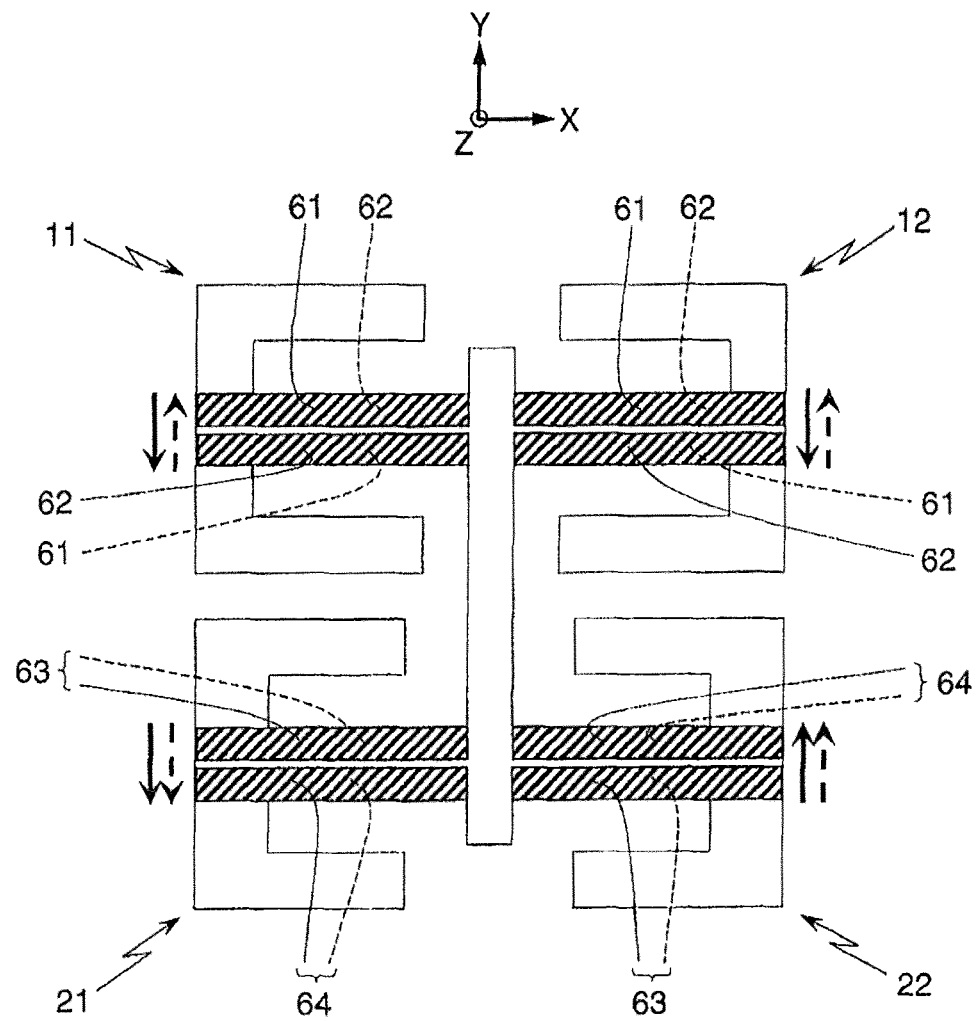
FIG. 6 is a front view of the vibrating elements of the gyrometer of FIG. 4 showing an arrangement of the selective excitation electrodes of the drive mode and the selective sense electrodes of the sense mode.

FIGS. 3B and 3C show excessively enlarged deformations of the vibrating element 10 for the two useful modes of vibration respectively and associated with appropriate positions of electrodes on the faces of the beam, as will be seen hereinafter with reference to FIG. 6. The oblique facets are not shown on FIGS. 3B and 3C.

For the first useful mode of vibration shown on FIG. 3B, the beam 1 undergoes an alternating torsional deformation around the longitudinal symmetry axis 3. The mass part 2 moves with an alternating rotation about said longitudinal symmetry axis and does not practically undergo any deformation.

For the second useful mode of vibration shown on FIG. 3C, the beam 1 undergoes an alternating flexional deformation parallel to the plane XY of the plate. The mass part 2 moves with an alternating displacement parallel to said plane and does not undergo practically any deformation.

Each of the two useful modes of vibration may be used as a drive mode, the other useful mode then being used as a sense mode. For instance, according to the embodiments as illustrated on FIGS. 3B and 3C, when an angular velocity $\Omega$ to which the vibrating element 10 is subjected, or a component of the angular velocity, is parallel to the plane XY of the plate and perpendicular to the symmetry axis 3, and when the first useful mode is the drive mode that generates alternating velocities V perpendicular to the plane XY of the plate, said velocities V are combined with the rotational velocity $\Omega$ for creating the Coriolis accelerations $\Gamma_c$ exciting the second useful mode. In this example, the vibrating element according to the present method, system and device is sensitive to a rotation with a velocity $\Omega$ around an axis parallel to the plane of the plate and perpendicular to the longitudinal axis of the beam.

The choice of these two useful modes of vibration combined with the symmetry of the vibrating element with respect to an axis parallel to the axis X of the quartz, generates practically a mechanical decoupling between the two modes. The two useful modes of vibration would not be independent if for one of them, the mass part moved for instance with an alternating motion perpendicularly to the plane of the plate, or if the vibrating element did not have said symmetry.

Furthermore, the position of the gravity center of the mass part 2 on the longitudinal axis 3 of the beam and the above mentioned intervals of the 1/e and L/e ratios contribute to the resonant frequencies of the two useful modes being close to each other, deviated, for instance, by about 1% in relative value, i.e. they are substantially equal, which is beneficial to the accuracy of the gyrometric measurement.

The present method, system and device are not restricted to the first above described embodiment of vibrating element 10 achieved through chemical machining a quartz plate parallel to the crystallographic plane XY, and combining a low manufacturing cost and the quasi absence of mechanical coupling between the two useful modes. The scope of the present method, system and device covers other types of machining operations, piezoelectric materials and crystallographic orientations, as explained hereinafter.

As far as machining is concerned, this should respect the symmetry of the structure of the vibrating element with respect to the longitudinal axis 3 of the structure, namely that of the beam 1. For instance, machining is carried out through ultrasound or through plasma etching.

As far as the piezoelectric material is concerned, the latter should belong to the same crystal symmetry class as the quartz, i.e. the symmetry class 32 with a trigonal crystal system. For instance, the piezoelectric material can be a synthesis material such as gallium orthophosphate $GaPO_4$, or belonging to the family of the langasites (LGS) or to that of the langanites (LGN) or to that of the langatates (LGT). All these piezoelectric materials have at least one pair of electric X and mechanical Y crystallographic axes perpendicular to an optical crystallographic axis Z.

As far as the orientation of the plate with respect to the crystallographic axes is concerned, the plane of the plate should be parallel to the axis X. The orientation of the plate can thus be considered as being derived from the orientation XY by a rotation of an angle $\theta$ about the axis X. The angle $\theta$ can be selected to optimize the behavior of the frequencies of both useful modes upon variations of temperature.

The present method, system and device also relate to a gyrometer including four vibrating elements according to the present method, system and device to protect the vibration quality of both useful modes against the influences of the fastening of the gyrometer. An exemplary embodiment of said gyrometer is explained with reference to FIGS. 4, 5A, 5B, 5C and 6 in which the oblique facets are not shown.

Figure 4:
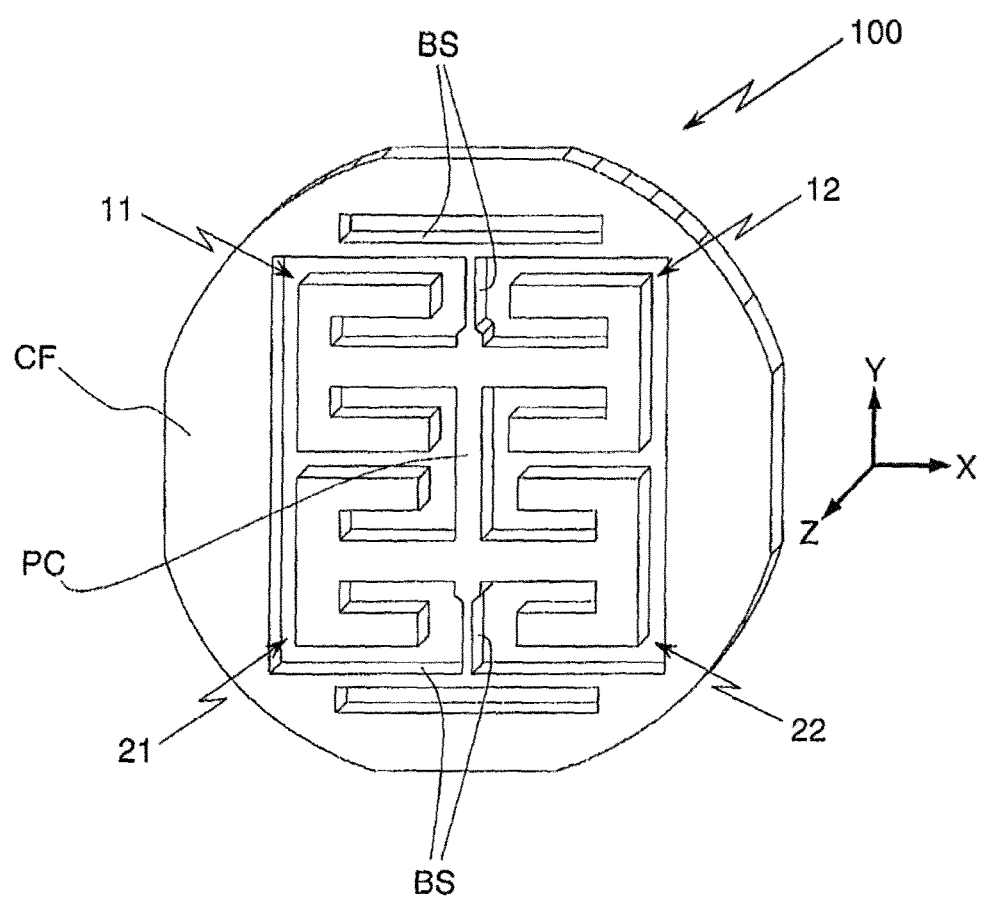
FIG. 4 is a perspective view of a gyrometer according to the present method, system and device, including four vibrating elements similar to that of FIG. 3A.

With reference to FIG. 4, a monolithic gyrometer 100 according to the present method, system and device includes four vibrating elements 11, 12, 21 and 22 similar to that 10 shown on FIG. 3A. The fixed parts of the vibrating elements are gathered into one set including a central common part PC in the shape of a bar extending parallel to the longitudinal axes of the beams of the four vibrating elements and connecting ends fastened to the beams of the first vibrating elements 11 and 12 at ends fastened to the beams of the second vibrating elements 21 and 22, two sets of flexible T-shaped arms BS, the legs of which are coaxial longitudinally to the common part and connected to the ends of the latter, and a fastening frame CF connected to the common part with the flexible arms. The common part PC is not fastened, as opposed to the fixed part PF of the vibrating element 10 shown on FIG. 3A. However, as will be explained later on, the common part PC remains spontaneously practically stationary for the useful modes of vibration of the gyrometer 100. Like the vibrating element 10 illustrated on FIG. 3A, the gyrometer 100 is made in a planar plate made in a piezoelectric material, such as quartz, parallel to the electric crystallographic axis X, in the present case parallel to the crystallographic plane XY, and having a uniform thickness for instance via chemical machining.

The first vibrating elements 11 and 12 are arranged on either sides of the common part PC and the longitudinal axes of their beams are collinear. The vibrating elements 11 and 12 are substantially identical and have, accordingly, a common frequency F1 for their first useful mode and a common frequency F2 for their second useful mode. The oblique facets (not shown) achieved through chemical machining the piezoelectric material not being identical for the elements 11 and 12, it can be advantageous to modify slightly the photolithographic tools so as to obtain a sufficient symmetry of the vibrating elements 11 and 12 with respect to the longitudinal axis of the common part PC perpendicular to the axis X and therefore a sufficient identity of the dynamic behaviors of the vibrating elements 11 and 12 and a balance of the latter with respect to the longitudinal axis of the common part. This situation is similar for the balance of the second vibrating elements 21 and 22 with respect to the longitudinal axis of the common part PC. Furthermore, the vibrating elements 11 and 12 are dimensioned so that the frequencies F1 and F2 are close to each other, deviating, for instance, by about 1% in relative value.

The vibrating elements 21 and 22 are arranged on either sides of the common part PC and the longitudinal axes of their beams are collinear. The vibrating elements 21 and 22 are substantially identical therebetween, but can be different from the elements 11 and 12. For instance as shown on FIG. 4, the elements 21 and 22 have beams of a length different from that of the beams of the elements 11 and 12, as well as U-shaped mass parts of dimensions different from those of the mass parts of the elements 11 and 12. The vibrating elements 21 and 22 are dimensioned so that the common frequency F'1 of their first useful mode is significantly different from F1, i.e. so that F1 and F'1 deviate by at least about 10% in relative value and that the common frequency F'2 of their second useful mode is substantially equal to F2. Such relationships between frequencies are achieved for instance acting both on the three dimensional parameters of the vibrating elements: the length of the beam, the length of the branches of the mass part, and the cross-sectional width of a portion of said mass part taken in the plane of the plate, such as the cross-sectional width of the web of a U.

Figure 5A:
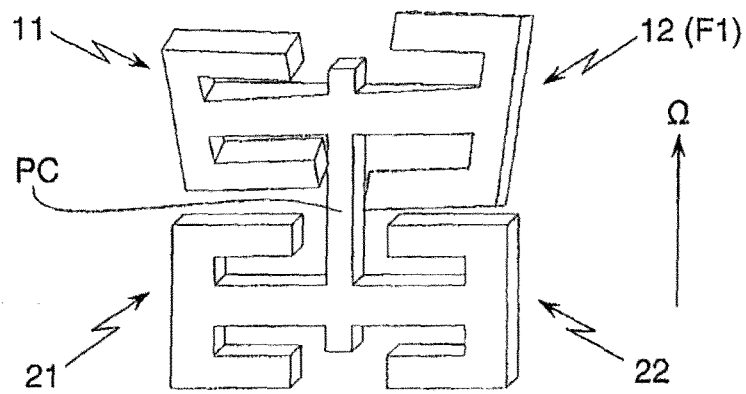
FIGS. 5A and 5B are perspective views showing exaggeratedly enlarged deformations of the vibrating elements of the gyrometer of FIG. 4 respectively for the drive mode and the sense mode.
Figure 5B:
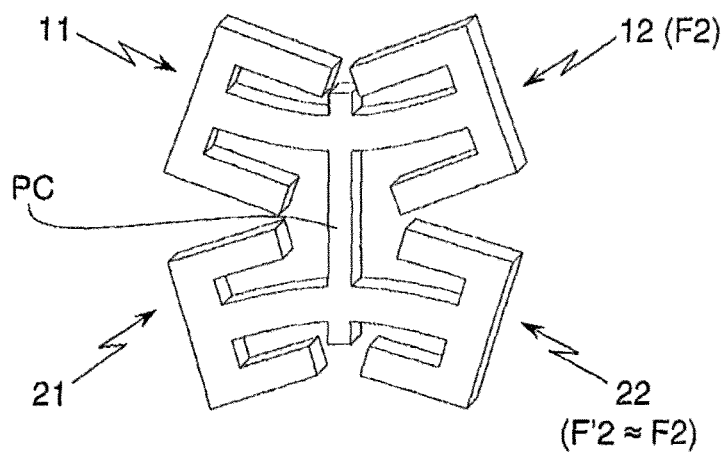
Figure 5C:
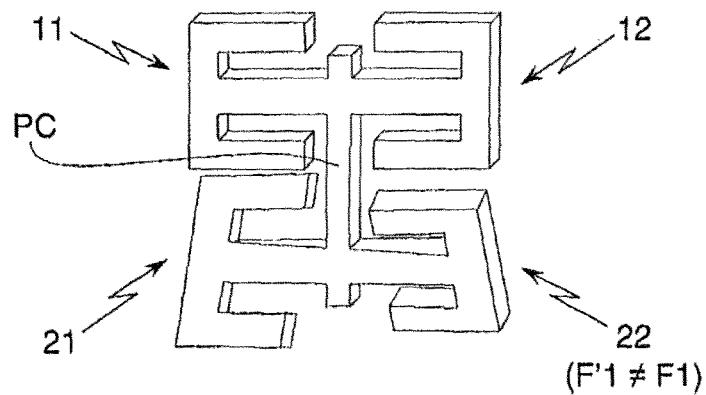
FIG. 5C is a perspective view showing exaggeratedly enlarged deformations of the vibrating elements of the gyrometer of FIG. 4 for another particular mode of vibration of interest to be taken into account in the dimensioning of the gyrometer.

Thus, the gyrometer 100 has three particular modes of vibration, as shown in FIGS. 5A, 5B and 5C limited to the four vibrating elements and to their common part PC.

The first particular mode of vibration shown on FIG. 5A is the drive mode of the gyrometer 100 and only practically sets in motion the two first elements 11 and 12 vibrating in phase opposition therebetween according to their first useful mode at the frequency F1. The alternating torsional stresses produced by the beams of the vibrating elements 11 and 12 are mutually equilibrating in the area of the common part PC fastened to the beams of the elements 11 and 12 that do not communicate any displacement to the second vibrating elements 21 and 22, the frequencies F1 and F'1 being significantly different.

The second particular mode of vibration shown on FIG. 5B is the sense mode of the gyrometer 100 and sets in motion the four vibrating elements on their second useful mode at the frequency F2 close to F1, the elements 11 and 12 vibrating in phase opposition respectively with the elements 21 and 22. The alternating flexional stresses produced by the four beams of the vibrating elements 11 and 12 are mutually equilibrating in the portion of the common part located between the fastened ends of the beams of the elements 11 and 12 and the fastened ends of the beams of the elements 21 and 22.

Like what was previously explained for one single vibrating element according to the present method, system and device with reference to FIGS. 3A, 3B and 3C, the gyrometer 100 including four vibrating elements is sensitive to a rotation with an angular velocity Ω to which the gyrometer is subjected, around an axis parallel to the plane of the plate and perpendicular to the longitudinal axes of the beams. Furthermore, there is practically no mechanical coupling between the drive mode and the sense mode of the gyrometer 100, as the two useful modes of each one of the four vibrating elements are practically decoupled. In contrast, the action of the Coriolis accelerations is less direct than for the single vibrating element shown on FIGS. 3B and 3C. In the case of the gyrometer 100, the alternating velocities generated by the drive mode are only relative to the elements 11 and 12, and therefore the Coriolis accelerations induced by the rotation to be measured only apply to such single elements 11 and 12 that are thereby vibrated. Because the four vibrating elements have substantially the same common frequency F2 for their second useful mode, the vibration of the elements 11 and 12 spontaneously causes the vibration in phase opposition of the elements 21 and 22, as well as, as far as it is a tuning fork with two branches, the excitation of one single branch in the vicinity of the tuning fork resonance spontaneously vibrates the two branches.

Finally, the third particular mode of vibration, as shown on FIG. 5C, practically sets in motion only the second elements 21 and 22 vibrating in phase opposition therebetween at the frequency F'1 significantly different from F1. This third particular mode is not a useful mode of the gyrometer 100, but is nevertheless of interest to be taken into account in dimensioning the gyrometer 100 as the more the frequency F'1 deviates from the frequency F1 of the drive mode of the gyrometer 100, the more the first and third particular modes are independent from each other. A deviation of at least about 10% in relative value between F1 and F'1 allows a sufficient independence to be reached so that the vibrations of each one of the first and third particular modes only practically relate to two of the four elements, as represented on FIGS. 5A and 5C.

It should be noticed that for the three particular modes of vibration, the common part remains spontaneously practically stationary. In such conditions, with reference to FIG. 4, the flexible arms BS allow small residual alternating motions of the common part to be efficiently filtered and thereby only practically negligible alternating stresses to be transmitted to the fastening frame CF. As a result, the fastening frame CF remains spontaneously stationary and its fastening on a casing base does not impair the vibration quality of the useful modes of the gyrometer 100. As an example, it is possible to make such a gyrometer according to the present method, system and device in a quartz pellet of a diameter of 9 mm and a thickness of 0.4 mm, and the two useful modes of vibration of which have frequencies close to 35 kHz and quality coefficients higher than 200,000.

It can seem interesting, for putting further apart the frequency F'1 of the third particular mode shown on FIG. 5C from the frequency F1 of the first mode of vibration illustrated on FIG. 5A, that the mass parts of the vibrating elements 21 and 22 do not include two symmetric branches, but are more compact, for instance with a square or rectangular shape, the mass parts of the vibrating elements 11 and 12 only keeping their two symmetric branches. Theoretically, this would not prevent from dimensioning the four vibrating elements so as the common part remains spontaneously practically stationary for the second particular mode. In practice, such a balance would be difficult to achieve, as the manufacturing tolerances would be more stringent than in the case illustrated on FIG. 4 where the four vibrating elements have similar shapes.

As far as the piezoelectric excitation and sensing of the two useful modes of vibration of the gyrometer 100 are concerned, electrodes adhering to the piezoelectric material are arranged on the two large faces of the plate. As shown on FIG. 6, the electrodes are distributed in two systems of excitation electrodes 61 and 62 mainly on the beams of the vibrating elements 11 and 12 and two systems of sense electrodes 63 and 64 mainly on the beams of the vibrating elements 21 and 22. The branches of the U-shapes of the mass parts 2 of the vibrating elements support no electrode. FIG. 6 shows an arrangement of the electrodes on one of said large faces, the arrangement of the electrodes on the other large face being geometrically identical but being able, depending on the useful mode considered, to be different through different electric polarities, as will be explained herein below. In order to better understand the drawing, the electrodes designated by a reference dashed line are located on the other large face.

On each one of the two large faces and for each one of the vibrating elements 11 and 12, 21 and 22, the electrodes 61 and 62, 63 and 64 have the shape of two substantially identical conductive strips extending parallel to the longitudinal axis of the beam of the vibrating element and covering the whole large face of the beam with the exception of a median band separating said two strips. Preferably, as shown on FIG. 6, the two strips extend on the web of the U-shaped mass part of the vibrating element. Preferably, the width of the median band separating the two strips is lower than 10% of the cross-sectional dimension of the beam taken in the plane of the plate.

For each one of the two large faces, four electric connections (not shown) respectively connect the collinear electrodes 61 of the vibrating elements 11 and 12, the collinear electrodes 62 of the vibrating elements 11 and 12, the misaligned electrodes 63 of the vibrating elements 21 and 22, and the misaligned electrodes 64 of the vibrating elements 21 and 22.

For each one of the vibrating elements 11 and 12, two electric connections (not shown), respectively connect the collinear electrodes 61 not superposed on the large faces and the electrodes 62 not superposed on the large faces. For each one of the vibrating elements 21 and 22, two electric connections (not shown), respectively connect the collinear electrodes 63 superposed on the large faces and the electrodes 64 superposed on the large faces.

The systems of the excitation electrodes 61 and 62 arranged on the vibrating elements 11 and 12 are able to selectively excite the drive mode of the gyrometer 100 illustrated on FIG. 5A relying on the distribution of the shear constraint $T_{XY}$ specific to the torsion of the beams of the vibrating elements 11 and 12 around their longitudinal axis and linked through piezoelectric effect to opposite components $E_Y$ of an alternative electric field on the main faces of the beams, when the electrodes 61 and 62 are respectively connected to terminals of an electronic oscillating circuit (not shown). For the drive mode, the constraint $T_{XY}$ relied on is the main constraint of the torsional vibration, and a minimum of electric voltage applied between the electrodes 61 and 62 acts optimally for exciting the drive mode.

The systems of the electrodes 63 and 64 arranged on the vibrating elements 21 and 22 are able to selectively sense the sense mode of the gyrometer 100 shown on FIG. 5B relying on the distribution of the shear constraint $T_{XY}$ specific to the flexion of the beams of the vibrating elements 21 and 22 parallel to the plane XY of the plate and linked through piezoelectric effect to components $E_Y$ of an alternative electric field having the same direction on the main faces of the beams, when the electrodes 63 and 64 are respectively connected to opposite polarity terminals of a capacitive circuit sensing an electric voltage (not shown). For the sense mode, the used constraint $T_{XY}$ is several times lower than the main mechanical tensile-compression constraint $T_{XX}$ of the alternatively stretched and compressed longitudinal fibers of the beams vibrating flexionally, said main mechanical constraint $T_{XX}$ being difficult to use because of the tensor of the piezoelectric coefficients of the quartz and the orientation of the beams following the axis X.

The selectivity of the excitation of the drive mode and the sensing of the sense mode, combined with the mechanical decoupling between these two modes of vibration, allows that, in the absence of a rotation Ω applied to the gyrometer 100, the vibration of the drive mode does not generate through piezoelectric effect the occurrence of electric loads on the sense electrodes 63 and 64.

Furthermore, the quite important distance between the excitation electrodes 61 and 62 and the sense electrodes 63 and 64 allows an alternative electrical excitation potential present on at least one of the electrodes 61 and 62 almost not to generate, via an electrostatic effect, the occurrence of electric loads on the electrodes 63 and 64.

Thus, the electric loads occurring on the electrodes 63 and 64 are practically only generated by the rotation to be measured, leading the gyrometer 100 to deliver an accurate measurement of the vibration amplitude of the sense mode proportional to the angular rotational velocity Ω. In addition, the gyrometer 100 is easy to make through chemical machining as it does not require any trimming, as opposed to the known gyrometer described in the preamble of the description.

Figure 7A:
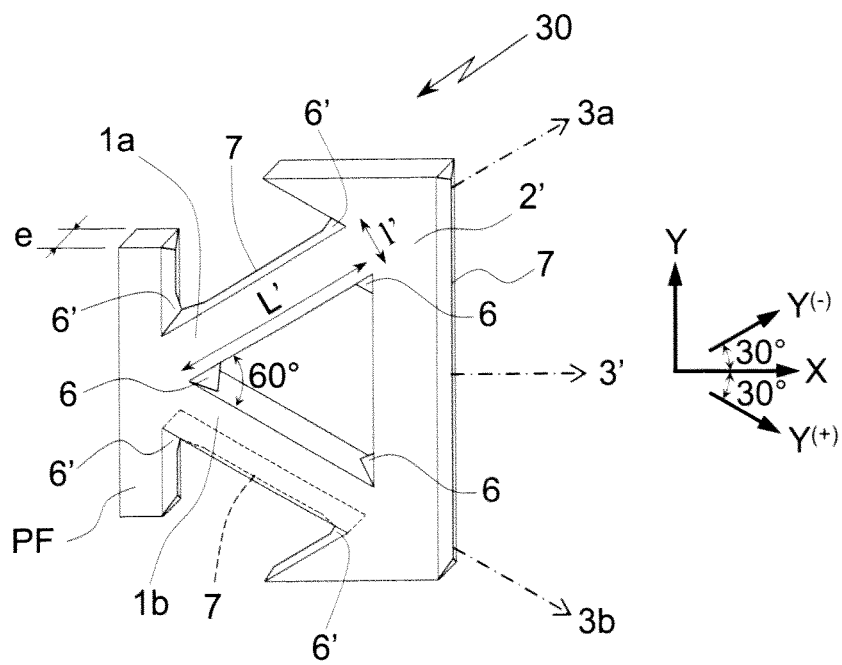
FIG. 7A is a perspective view of a vibrating element according to a second embodiment of the present method, system and device.

FIG. 7A shows a second embodiment of a monolithic vibrating element 30 according to the present method, system and device, allowing the electric loads induced by the rotation to be measured to be increased so as to further improve the accuracy of the gyrometric measurement. Such increase of electric loads will be explained later on in relationship with the description of a gyrometer including four vibrating elements being similar to the vibrating element 30.

The vibrating element 30, machined in a planar plate made in a piezoelectric material, such as quartz, having a uniform thickness e, includes two parallelepipedic beams 1a and 1b having substantially identical dimensions and having ends fastened therebetween, the longitudinal axes 3a and 3b of which form an angle of about 60°, a fixed part PF' fastened to fastened ends of the beams at the apex of said angle, and a mass part 2' fastened to the other ends of the beams 1a and 1b and having the general shape of a bar with sharp ends oriented to the fixed part. The vibrating element 30 is symmetric about a longitudinal axis 3' bisecting the angle between the longitudinal axes 3a and 3b of the beams. The mass part 2' and the two beams 1a and 1b form the outline of a substantially equilateral triangle. Thus, the two beams 1a and 1b can be regarded as substituting the beam 1 in the vibrating element 10 shown on FIG. 3A. Similarly to the first embodiment, the mass part 2' can be conformed with several shapes of symmetric branches at the ends of a bar rectilinear or symmetrically curved with respect to the axis 3'.

Still referring to FIG. 7A, the cross-sectional dimension 1' of each one of the beams 1a and 1b taken in the plane of the plate is substantially larger than its other cross-sectional dimension e. Preferably, the dimension 1' lies between about 1.1 times and about 1.5 times the dimension e. Preferably, the length dimension L' of each one of the beams lies between about 4 times and about 6 times the dimension e.

As for the vibrating element 10 shown on FIG. 3A, the plate is parallel to the crystallographic plane XY of the quartz and the symmetry axis 3' is oriented following one of the electric crystallographic axes of the quartz designated as X. Taking into account the ternary symmetry of the quartz expressing that the crystalline pattern of the latter is repeated every 120° around the optical axis Z in the plane XY of the plate, the longitudinal axes 3a and 3b of the beams 1a and 1b are respectively oriented parallel to the two mechanical crystallographic axes other than the shown axis Y orthogonal to the axis X parallel to the symmetry axis 3' and, as shown on FIG. 7A, one 1*b* of the beams is facing the positive direction of the axis Y and the other beam 1*a* is facing the negative direction of the axis Y. Chemically machining the vibrating element 30 in an etching bath comprising hydrofluoric acid causes the occurrence of oblique facets 6 and 6' and facets having the shape of dihedrons 7. The oblique facets 6 are located at the apexes of 60° dihedrons at internal in a triangular opening between the beams 1*a* and 1*b* and the mass part 2'. The oblique facets 6' are located at the apexes of 60° dihedrons between the beams 1*a* and 1*b* and the fixed part PF' and between the beams 1*a* and 1*b* and the sharp ends of the mass part 2'. The facets 7 are located along flanks of the beams 1*a* and 1*b* and of the mass part 2' located outside the equilateral triangle formed by said beams and said mass part. The arrangement of such oblique facets and such dihedrons is symmetric about the axis 3'. The symmetry between the facets is due to the orientation of the axis 3' following the axis X of the quartz and to the nature of the etching bath comprising hydrofluoric acid.

Figure 7B:
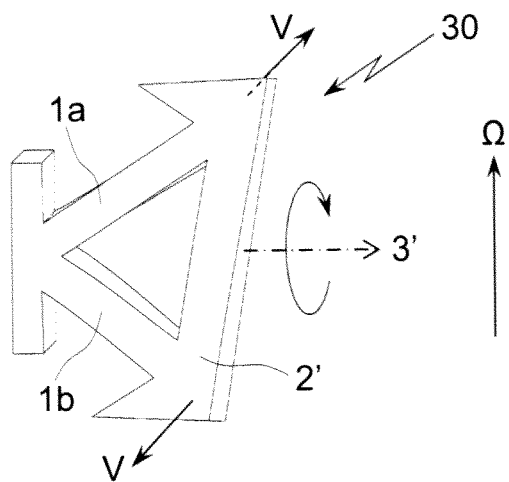
FIGS. 7B and 7C are perspective views showing exaggeratedly enlarged deformations of the vibrating element respectively for both useful modes of vibration.
Figure 7C:
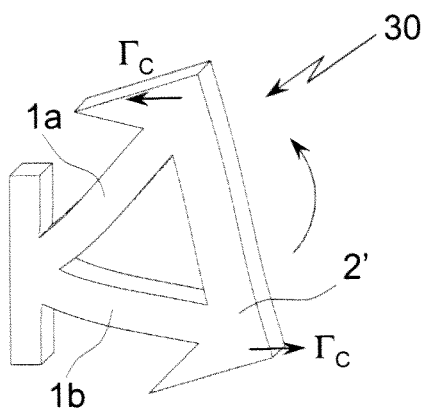
Figure 10:
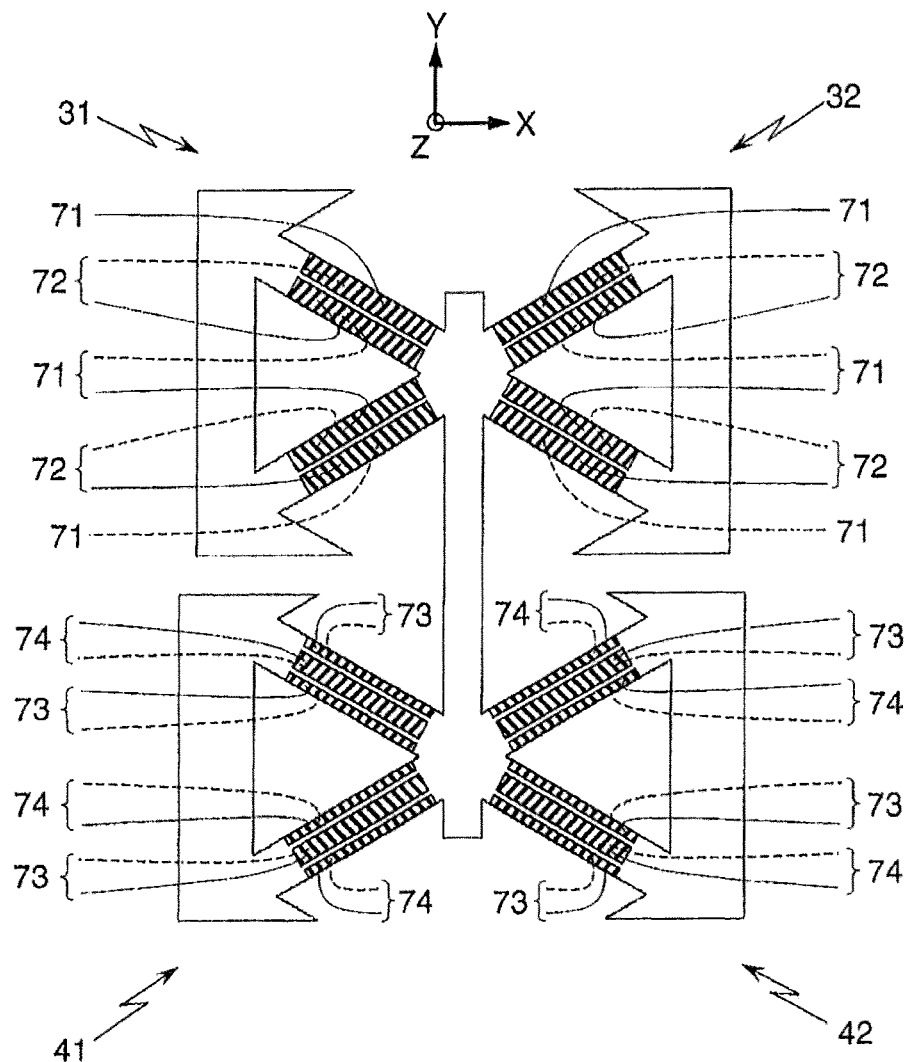
FIG. 10 is a front view of the vibrating elements of the gyrometer of FIG. 8 showing an arrangement of the selective excitation electrodes of the drive mode and the selective sense electrodes of the sense mode.

FIGS. 7B and 7C show excessively enlarged deformations of the vibrating element 30 for the two useful modes of vibration respectively and associated with appropriate positions of electrodes on the faces of the beam, as will be seen hereinafter with reference to FIG. 10. The oblique facets are not shown on FIGS. 7B and 7C.

For the first useful mode of vibration shown on FIG. 7B, the beams 1*a* and 1*b* mainly undergo alternating flexional deformations perpendicularly to the plane of the plate and, in a lesser extent, alternating torsional deformations around their longitudinal axes. The mass part 2' moves with an alternating rotation about the symmetry axis 3' of the vibrating element and thus of alternating velocities V perpendicular to the plane XY of the plate and does not practically undergo any deformation.

For the second useful mode of vibration shown on FIG. 7C, the beams 1*a* and 1*b* undergo alternating flexional deformations parallel to the plane XY of the plate. The mass part 2' moves with an alternating displacement parallel to said plane and does not undergo practically any deformation.

As for the vibrating element 10 shown on FIGS. 3B and 3C, the vibrating element 30 is sensitive to a rotation with an angular velocity $\Omega$ about an axis parallel to the plane of the plate and perpendicular to the symmetry axis 3' of the vibrating element.

As for the vibrating element 10, the choice of these two useful modes of vibration of the vibrating element 30, combined with the symmetry of the vibrating element about an axis parallel to the axis X of the quartz, allows for practically no mechanical coupling between the two modes. If the angular velocity $\Omega$ is nil, the excitation of the vibrating element 30 according to the first mode does not generate the second mode.

As for the vibrating element 10, the position of the gravity center of the mass part 2' on the symmetry axis 3' and the above-mentioned intervals of the 1'/e and L'/e ratios contribute to the resonant frequencies of the two useful modes being close to each other, deviated, for instance, by about 1% in relative value, that is they are substantially equal, which is beneficial to the accuracy of the gyrometric measurement.

As for the vibrating element 10, the scope of the present method, system and device further covers types of machining allowing the symmetry of the vibrating element 30 to be respected about its symmetry axis 3', piezoelectric materials belonging to the same crystal symmetry class 32 as the quartz, and the orientations of the plate derived from the crystallographic orientation XY by a rotation of an angle $\theta$ about the axis X.

Figure 8:
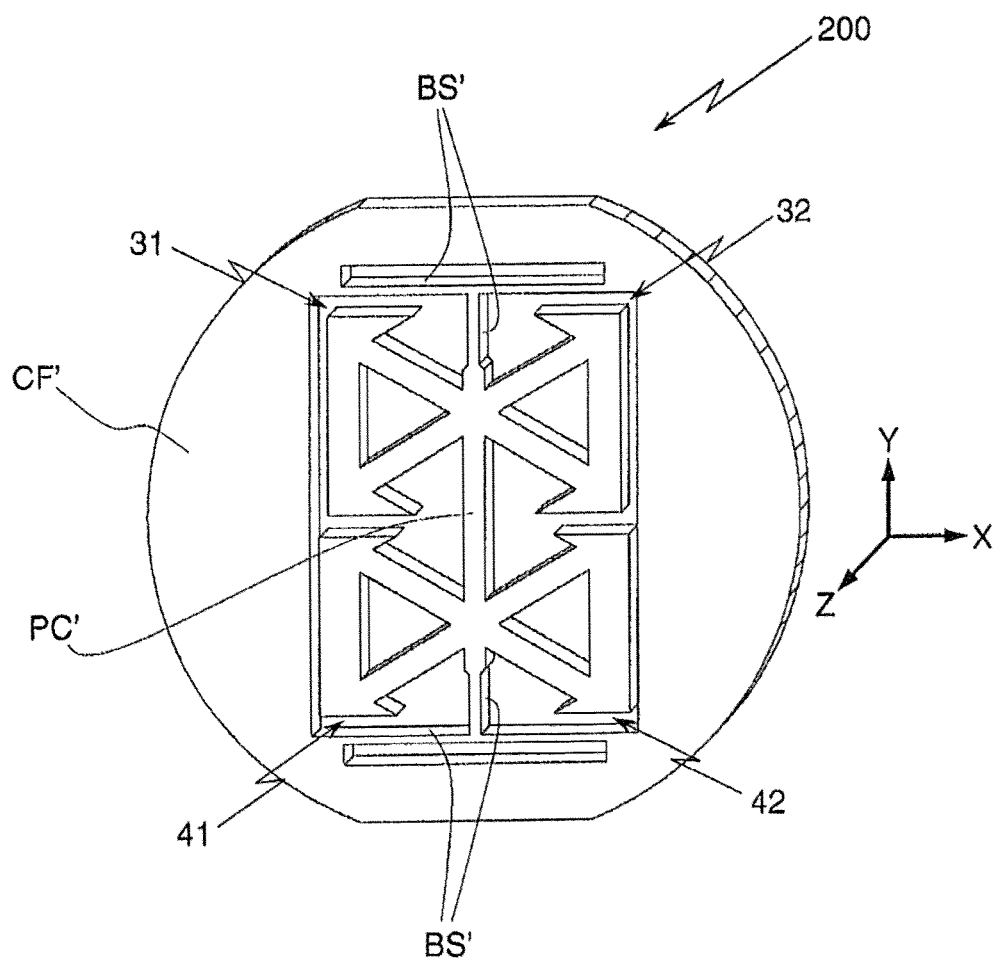
FIG. 8 is a perspective view of a gyrometer according to the present method, system and device, including four vibrating elements similar to that of FIG. 7A.

The present method, system and device also relate to a monolithic gyrometer including four vibrating elements 31, 32, 41 and 42 similar to the vibrating element 30 according to the second embodiment, to protect the vibration quality of both useful modes against the influences of the fastening of the gyrometer. The arrangement of such a gyrometer 200, shown on FIG. 8, is similar to that of the gyrometer 100 illustrated on FIG. 4 as far as the arrangement of the four vibrating elements 31, 32, 41 and 42, the common part PC', the flexible arms BS' and the fastening frame CF' is concerned. The vibrating elements 31 and 32 are substantially identical therebetween, but can be different from the elements 41 and 42 which are substantially identical. The beams of the elements 31 and 32 are substantially collinear longitudinally two to two and together form a cross. Similarly, the beams of the elements 41 and 42 are substantially collinear longitudinally two to two and together form a cross.

Figure 9A:
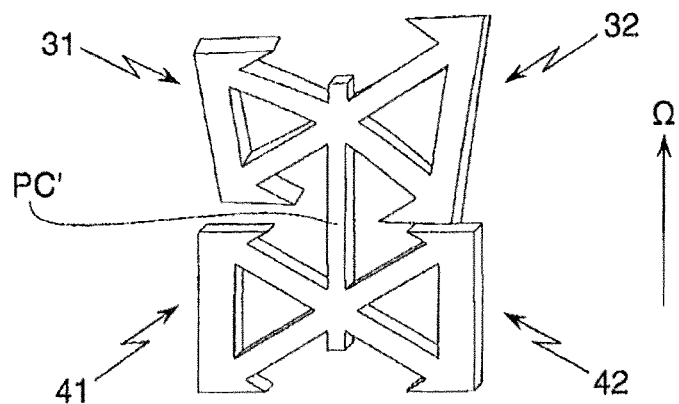
FIGS. 9A and 9B are perspective views showing exaggeratedly enlarged deformations of the vibrating elements of the gyrometer of FIG. 8 respectively for the drive mode and the sense mode.
Figure 9B:
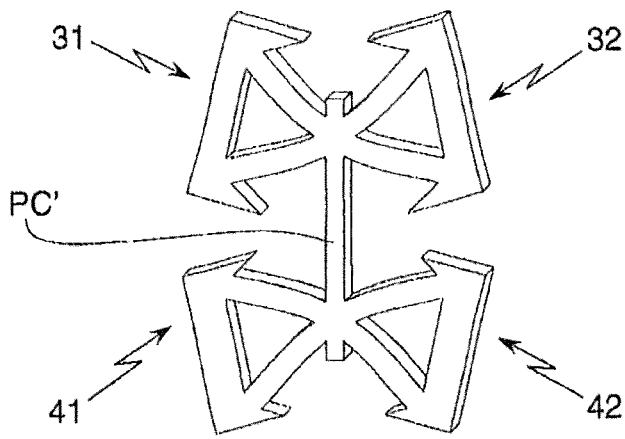
Figure 9C:
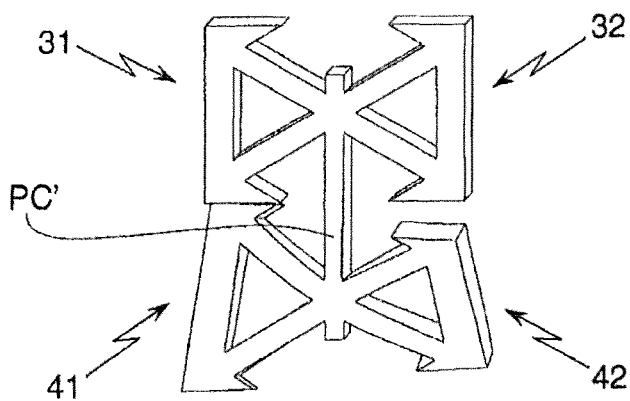
FIG. 9C is a perspective view showing exaggeratedly enlarged deformations of the vibrating elements of the gyrometer of FIG. 8 for another particular mode of interest to be taken into account in the dimensioning of the gyrometer.

Similarly to the gyrometer 100, the gyrometer 200 has three particular modes of vibration, as illustrated on FIGS. 9A, 9B and 9C limited to the four vibrating elements and to their common part PC'.

The drive mode of the gyrometer 200 only sets in motion two elements 31 and vibrating in phase opposition therebetween according to their first useful mode such as represented on FIG. 9A. The sense mode sets in motion the four elements vibrating according to their second useful mode, the elements 31 and 32 vibrating in phase opposition respectively with the elements 41 and 42, as shown on FIG. 9B. The frequencies of the drive mode and the sense mode are close to each other. The third particular mode of vibration shown on FIG. 9C practically sets in motion only the two elements 41 and 42 vibrating in phase opposition at a frequency deviated by at least 10% from the frequency of the drive mode.

As for the gyrometer 100, electrodes adhering to the piezoelectric material are arranged on the two large faces of the plate. As shown on FIG. 10, the electrodes are distributed in two systems of excitation electrodes 71 and 72 on the beams of the vibrating elements 31 and 32 and two systems of sense electrodes 73 and 74 on the beams of the vibrating elements 41 and 42. The mass parts 2' of the vibrating elements support no electrode. FIG. 10 shows an arrangement of the electrodes on one of said large faces, the arrangement of the electrodes on the other large face being geometrically identical but being able, depending on the useful mode being considered, to be different through different electric polarities.

Each one of the beams of the vibrating elements of the gyrometer 200 being oriented according to a respective mechanical axis of the quartz and mainly operating in flexion, the faces of the beams of the elements 31 and 32 support a known electrode arrangement with two conductive strips 71 and 72, so as to selectively excite the drive mode for which the beams of the elements 31 and 32 vibrate perpendicularly to the plane of the plate. The faces of the beams of the elements 41 and 42 support a known arrangement of electrodes with three conductive strips 73 and 74 so as to selectively sense the sense mode for which the beams of the elements 41 and 42 vibrate parallelly to the plane of the plate. In order to better understand FIG. 10, it should be understood that electrodes designated with the same reference numeral are connected therebetween by electric connections (not shown).

For the known two-strip arrangement, two electrodes 71, or 72, not superposed on the faces of a beam of an element 31, 32 are connected. Two excitation electrodes 71 or 72 extending longitudinally on a large face of two substantially collinear beams of the elements 31 and 32 are substantially collinear and connected.

For the known three-strip arrangement, each one of the faces of a beam supports three parallel sense electrodes extending longitudinally. These three electrodes are two edge electrodes adjacent to the flanks of the beam and a central electrode located between the edge electrodes. The four edge electrodes on the faces of the beam are superposed two to two. The two central electrodes on the faces of the beam are also superposed. The eight edge electrodes 73 on two first substantially collinear beams of the elements 41 and 42 are connected and respectively substantially collinear two to two. The four central electrodes 74 on the two first beams of the elements 41 and 42 are connected and respectively substantially collinear two to two. Eight edge electrodes 74 and four central electrodes 73 on two second substantially collinear beams of the elements 41 and 42 are arranged in the same manner as the eight edge electrodes 73 and the four central electrodes 74 on the first beams of the elements 41 and 42. The eight edge electrodes 73 on the first beams are connected to the four central electrodes 73 of the second beams, and the eight edge electrodes 74 on the second beams are connected to the four central electrodes 74 of the first beams.

The gyrometer 200 allows, compared to the gyrometer 100, the electric loads induced by the rotation to be measured to be increased, thereby improving the accuracy of the gyrometric measurement, i.e. the measurement of the vibration amplitude of the sense mode proportional to the angular rotational velocity $\Omega$. For the drive mode and the sense mode of the gyrometer 200, the main mechanical constraint is the tensile-compression constraint $T_{XY}$ of the alternately stretched and compressed longitudinal fibers of the beams vibrating flexionally. The known electrode systems with two strips and three strips allow to use piezoelectrically this constraint in an optimal way, i.e. the electrodes 71 and 72 supported by the vibrating elements 31 and 32 allow the drive mode to be excited with a low electric voltage therebetween, as for the gyrometer 100, and the sense electrodes 73 and 74 supported by the vibrating elements 41 and 42 allow many more loads induced by the Coriolis accelerations to be sensed, as compared to the sensing by means of the gyrometer 100. The amount of loads induced by the Coriolis accelerations and thus the accuracy of the gyrometric measurement with the gyrometer 200 are thus several times higher than those with the gyrometer 100.

The invention claimed is:

1. A vibrating element made in a piezoelectric material machinable through a chemical process, having first and second modes of vibration and having a monolithic structure with a material of uniform thickness and being planar parallelly to a crystallographic plane XY of the material, which includes an electric crystallographic axis X and a mechanical crystallographic axis Y, and including a single substantially parallelepiped beam supporting electrodes configured to take part in one of the two modes of vibration; said beam comprising a longitudinal axis oriented along the electric crystallographic axis X;

a fixed part fastened to one of the ends of the beam and a mass part fastened to the other end of the beam, the mass part being movable with an alternating displacement parallel to the plane XY of the monolithic structure following the second mode of vibration, and the mass part has a center of gravity located on a symmetry axis; and wherein the monolithic structure has the symmetry axis parallel to the electric crystallographic axis X, is movable with an alternating rotation about the symmetry axis following the first mode of vibration, and all the electrodes of the monolithic structure are located, at least in part, on the single substantially parallelepiped beam and shaped as two substantially identical strips extending parallel to the longitudinal axis of the beam.

2. The vibrating element according to claim 1, wherein the mass part includes two branches symmetric about the symmetry axis and having ends fastened to said other end of the beam, and the gravity center of the mass part is located on the symmetry axis between the ends of the beam.

3. The vibrating element according to claim 2, wherein the beam has a cross-sectional dimension taken along the crystallographic plane XY of the material of between about 1.3 times and about twice the beam's other cross-sectional dimension, and a length of between about 4 times and about 5 times said other cross-sectional dimension.

4. The vibrating element according to claim 1, further comprising a second beam supporting other electrodes, the second beam being substantially parallelepiped and angled to the beam and having ends fastened to the fixed part and the mass part.

5. The vibrating element according to claim 4, wherein each one of the beams has a cross-sectional dimension taken along the crystallographic plane XY of the material of between about 1.1 times and about 1.5 times each one of the beams' other cross-sectional dimensions, and a length of between about 4 times and about 6 times said other cross-sectional dimensions of the two beams.

6. The vibrating element according to claim 4, wherein the beams form an angle of approximately 60°.

7. The vibrating element according to claim 1, wherein the first and second modes of vibration have substantially equal resonant frequencies.

8. The vibrating element according to claim 1, wherein the piezoelectric material belongs to a crystal symmetry class 32.

9. The vibrating element according to claim 1, wherein the first and second modes of vibration have resonant frequencies within 1% of one another.

10. A gyrometer comprising:

two first substantially identical vibrating elements having first and second modes of vibration and having a monolithic structure with a uniform thickness fastened to collinear beams, supporting electrodes for taking part in the first mode of vibration; the collinear beams having a common longitudinal axis and being substantially parallelepiped and the two first substantially identical vibrating elements being symmetrical about the common longitudinal axis of the collinear beams; and two second substantially identical vibrating elements having first and second modes of vibration and having a monolithic structure with a uniform thickness and fastened to collinear beams and supporting electrodes for taking part in the second mode of vibration; the collinear beams having a common longitudinal axis and being substantially parallelepiped and the two second substantially identical vibrating elements being symmetrical about the common longitudinal axis of the collinear beams; and wherein fixed parts of the first and second substantially identical vibrating elements including together a central common part connecting ends of the collinear beams of the first vibrating elements and ends of the collinear beams of the second vibrating elements, and flexible arms connecting the central common part to a fastening part.

11. The gyrometer according to claim 10, wherein:
the electrodes supported by faces of the beam of each first vibrating element are first and second longitudinal electrodes superposed to the second and first electrodes on the other faces of the beam and respectively collinear to the first and second electrodes on the other first vibrating element, the four first electrodes being connected therebetween and the four second electrodes being connected therebetween.

12. The gyrometer according to claim 10, wherein:
faces of a beam of each first vibrating element longitudinally support first parallel electrodes and second parallel electrodes, a first electrode on the face of the beam of each first vibrating element is superposed to a second electrode on the other face of the beam, the first electrodes on two substantially collinear beams of the first vibrating elements are substantially collinear two to two, the second electrodes on two substantially collinear beams of the first vibrating elements are substantially collinear two to two, the eight first electrodes are connected therebetween and the eight second electrodes are connected therebetween, each one of the faces of a beam of a second vibrating element supports three parallel electrodes extending longitudinally, said three electrodes of a beam are two third electrodes adjacent to the flanks of the beam and a fourth electrode is arranged between the third electrodes, the four third electrodes on the faces of a beam are superposed two to two, the two fourth electrodes on the faces of a beam are superposed, the eight third electrodes on two first substantially collinear beams of the second vibrating elements are connected and respectively substantially collinear two to two, the four fourth electrodes on the two first beams of the second vibrating elements are connected and respectively substantially collinear two to two, eight third electrodes and four fourth electrodes on two second substantially collinear beams of the second vibrating elements are arranged in the same manner as the eight third electrodes and the four fourth electrodes on the first beams of the second vibrating elements, and the eight third electrodes on the first beams of the second vibrating elements are connected to four fourth electrodes of the second beams of the second vibrating elements, and the eight third electrodes on the second beams of the second vibrating elements are connected to the four fourth electrodes of the first beams of the second vibrating elements.

13. The gyrometer according to claim 10, wherein the first vibrating elements are different from the second vibrating elements.

14. The gyrometer according to claim 10, wherein the first modes of vibration of the first and second vibrating elements have different resonant frequencies and the second modes of vibration of the first and second vibrating elements have substantially equal resonant frequencies.

15. The gyrometer of claim 10, wherein the beams of the two first substantially identical vibrating elements are longer than the beams of the two second substantially identical vibrating elements.

16. The gyrometer of claim 10, wherein the two first substantially identical vibrating elements and the two second substantially identical vibrating elements have substantially similar sized and shaped oblique facets.

17. The gyrometer of claim 15, wherein the two first substantially identical vibrating elements have substantially similar sized and shaped oblique facets and the two second substantially identical vibrating elements have substantially similar sized and shaped oblique facets.

18. A method for manufacturing a gyrometer comprising:
orienting a quartz plate to a crystallographic plane XY of a material, which includes an electric crystallographic axis X and a mechanical crystallographic axis Y;
chemically machining the quartz plate;
wherein the chemical machining forms two first substantially identical vibrating elements having first and second modes of vibration and having a monolithic structure with a uniform thickness and including substantially parallelepiped collinear beams supporting electrodes configure take part in one of the two modes of vibration, a fixed part fastened to one of the ends of the beams and a mass part fastened to the other end of the beams, wherein the collinear beams of the first vibrating elements having a symmetry axis oriented along the electric crystallographic axis X; and
forms two second substantially identical vibrating elements having first and second modes of vibration and having a monolithic structure with a uniform thickness and including substantially parallelepiped beams supporting electrodes configure take part in one of the two modes of vibration, a fixed part fastened to one of the ends of the beams and a mass part fastened to the other end of the beams, wherein the collinear beams of the second vibrating elements having a symmetry axis parallel to the electric oriented along the electric crystallographic axis X; and
wherein the fixed parts of the first and second substantially identical vibrating elements including together a central common part connecting ends of the collinear beams of the first vibrating elements and ends of the collinear beams of the second vibrating elements, and flexible arms connecting the central common part to a fastening part.

19. The method of claim 18, wherein the beams of the two first substantially identical vibrating elements are longer than the beams of the two second substantially identical vibrating elements.

20. The method of claim 19, wherein the two first substantially identical vibrating elements have substantially similar sized and shaped oblique facets and the two second substantially identical vibrating elements have substantially similar sized and shaped oblique facets.

* * * * *